US007760133B2

(12) United States Patent
Shirai et al.

(10) Patent No.: US 7,760,133 B2
(45) Date of Patent: Jul. 20, 2010

(54) RADAR APPARATUS ENABLING SIMPLIFIED SUPPRESSION OF INTERFERENCE SIGNAL COMPONENTS WHICH RESULT FROM RECEPTION OF DIRECTLY TRANSMITTED RADAR WAVES FROM ANOTHER RADAR APPARATUS

(75) Inventors: Hideki Shirai, Koganei (JP); Chiharu Yamano, Tokyo (JP); Kazuma Natsume, Oobu (JP); Yuu Watanabe, Toyota (JP); Mai Sakamoto, Kounan (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/269,205

(22) Filed: Nov. 12, 2008

(65) Prior Publication Data

US 2009/0121918 A1 May 14, 2009

(30) Foreign Application Priority Data

Nov. 12, 2007 (JP) ............................. 2007-292856

(51) Int. Cl.
*G01S 13/34* (2006.01)
*G01S 13/56* (2006.01)
*G01S 7/35* (2006.01)
*G01S 13/00* (2006.01)
*G01S 7/00* (2006.01)

(52) U.S. Cl. ..................... 342/159; 342/118; 342/128; 342/146; 342/147; 342/158; 342/175; 342/192; 342/195; 342/196

(58) Field of Classification Search ............. 342/13–19, 342/27, 28, 70–103, 118, 128–133, 145–158, 342/159–165, 175, 189–197, 378–384; 375/130–153
See application file for complete search history.

(56) References Cited

U.S. PATENT DOCUMENTS

| 3,670,327 | A | * | 6/1972 | Clare et al. | 342/102 |
| 3,701,154 | A | * | 10/1972 | McKinney | 342/132 |
| 3,745,568 | A | * | 7/1973 | Schindler et al. | 342/192 |
| 3,787,854 | A | * | 1/1974 | Friedman et al. | 342/28 |

(Continued)

FOREIGN PATENT DOCUMENTS

GB        2251526  A  *  7/1992

(Continued)

OTHER PUBLICATIONS

Nohara et al, "Adaptive Mainbeam Jamming Suppression for Multi-Function Radars", IEEE 1998 National Radar Conference, Dallas, TX; May 12-13, 1998; pp. 207-212.

(Continued)

*Primary Examiner*—Bernarr E Gregory
(74) *Attorney, Agent, or Firm*—Nixon & Vanderhye PC

(57) ABSTRACT

In a FM-CW or CW radar apparatus, when interference components are contained in channel signals obtained as beat signals from array antenna elements of respective channels, and the interference components result from directly receiving transmitted CW radar waves from an external source, phase shifting is applied to each of the channel signals to shift respective phases of the interference components of the respective channels to a condition corresponding to reception of interference waves from a predetermined direction. The interference components are then eliminated, and reverse phase shifting is applied to restore remaining components of the channel signals to their original phase condition.

4 Claims, 9 Drawing Sheets

U.S. PATENT DOCUMENTS

| | | | | |
|---|---|---|---|---|
| 3,896,436 A * | 7/1975 | Johnson | | 342/194 |
| 3,995,271 A * | 11/1976 | Goggins, Jr. | | 342/91 |
| 4,005,420 A * | 1/1977 | McDonald | | 342/84 |
| 4,028,697 A * | 6/1977 | Albanese et al. | | 342/159 |
| 4,035,799 A * | 7/1977 | Hsiao | | 342/162 |
| 4,173,017 A * | 10/1979 | Burlage et al. | | 342/162 |
| 4,293,856 A * | 10/1981 | Chressanthis et al. | | 342/93 |
| 4,825,214 A * | 4/1989 | Dejaegher | | 342/128 |
| 4,968,967 A * | 11/1990 | Stove | | 342/165 |
| 5,258,996 A * | 11/1993 | Fraser et al. | | 375/146 |
| 5,258,997 A * | 11/1993 | Fraser et al. | | 375/146 |
| 5,317,320 A * | 5/1994 | Grover et al. | | 342/159 |
| 5,473,332 A * | 12/1995 | James et al. | | 342/159 |
| 5,633,643 A * | 5/1997 | Erhage | | 342/159 |
| 5,731,781 A * | 3/1998 | Reed | | 342/70 |
| 5,774,089 A * | 6/1998 | Bamler et al. | | 342/195 |
| 5,926,135 A * | 7/1999 | Minkoff | | 342/379 |
| 5,940,025 A * | 8/1999 | Koehnke et al. | | 342/159 |
| 5,973,634 A * | 10/1999 | Kare | | 342/159 |
| 6,067,048 A | 5/2000 | Yamada | | |
| 6,313,782 B1 * | 11/2001 | Lehan et al. | | 342/159 |
| 6,462,705 B1 * | 10/2002 | McEwan | | 342/175 |
| 6,518,917 B1 * | 2/2003 | Durfee et al. | | 342/160 |
| 6,525,685 B1 * | 2/2003 | Rose | | 342/148 |
| 6,542,112 B1 * | 4/2003 | Chen et al. | | 342/165 |
| 6,650,271 B1 * | 11/2003 | Simone et al. | | 342/16 |
| 6,664,919 B2 * | 12/2003 | Isaji | | 342/70 |
| 6,963,303 B1 * | 11/2005 | Beisner | | 342/159 |
| 7,126,526 B2 * | 10/2006 | Wasiewicz | | 342/159 |
| 7,199,752 B2 * | 4/2007 | Wasiewicz | | 342/159 |
| 7,295,145 B2 * | 11/2007 | Weber | | 342/16 |
| 7,495,604 B2 * | 2/2009 | Yamano et al. | | 342/146 |
| 2003/0179131 A1 * | 9/2003 | Brosche | | 342/159 |
| 2005/0046609 A1 * | 3/2005 | Wasiewicz | | 342/159 |
| 2006/0017604 A1 * | 1/2006 | Weber | | 342/16 |
| 2007/0008214 A1 * | 1/2007 | Wasiewicz | | 342/159 |
| 2008/0036645 A1 | 2/2008 | Yamano et al. | | |

FOREIGN PATENT DOCUMENTS

| | | |
|---|---|---|
| JP | H11-231040 | 8/1999 |
| JP | 2007-232383 | 9/2007 |

OTHER PUBLICATIONS

Nobuyoshi Kikuma, "Adaptive Signal Processing with Array Antennas"; the Science Technology Publishing Co.; 1998; pp. 173-181 (w/partial English translation).

\* cited by examiner

CONCURRENT RECEPTION AND SAMPLING OF CHANNEL SIGNALS

MULTIPLEXED RECEPTION AND SAMPLING OF CHANNEL SIGNALS ch 1  2  3

EXTRACTED SIGNALS CONSIST ALMOST ENTIRELY OF INTERFERENCE SIGNALS

⇩

MAIN COMPONENTS (INTERFERENCE COMPONENTS) CAN BE REMOVED WITHOUT REQUIRING TO OBTAIN DIRECTION OF INTERFERENCE SOURCE

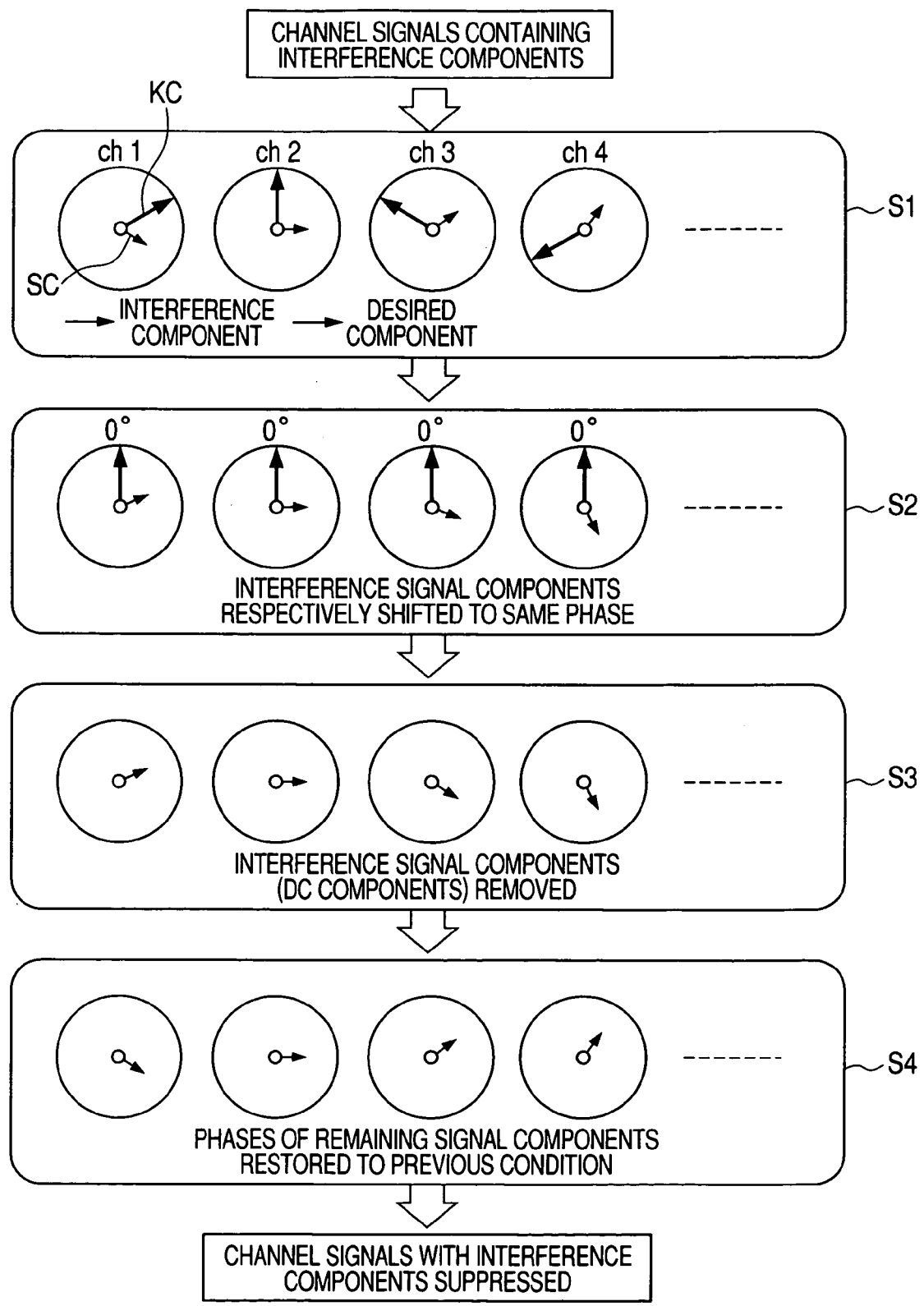

RADAR APPARATUS ENABLING SIMPLIFIED SUPPRESSION OF INTERFERENCE SIGNAL COMPONENTS WHICH RESULT FROM RECEPTION OF DIRECTLY TRANSMITTED RADAR WAVES FROM ANOTHER RADAR APPARATUS

CROSS-REFERENCE TO RELATED APPLICATIONS

This application is based on and incorporates herein by reference Japanese Patent Application No. 2007-292856 filed on Nov. 12, 2007.

BACKGROUND OF THE INVENTION

1. Field of Application

The present invention relates to an electronic scanning type of radar apparatus, and in particular to a vehicle-installation FM-CW (frequency modulation, continuous wave) or CW (continuous wave) type of electronic scanning radar apparatus which enables an interference component contained in a received signal to be suppressed.

2. Description of Related Art

Types of radar apparatus for vehicle installation are known which can detect the distance, velocity and direction (i.e., azimuth bearing) of a target object such as a preceding vehicle, for use in collision avoidance and vehicle control. A vehicle equipped with such a radar apparatus, and for which the apparatus operation is being described, will be referred to in the following as the local vehicle. One method of achieving this is to utilize FM-CW radar. This has advantages such as simplicity of the circuit configuration required for signal processing, etc.

The upper and lower timing diagrams of FIG. 1 are timing diagrams for describing the principles of mixing of transmitted and received signals with FM-CW radar. S1 denotes a signal that is transmitted as electromagnetic waves from an antenna by a FM-CW radar apparatus of the local vehicle, and whose frequency varies linearly with time, in alternating intervals of frequency increase and frequency decrease as shown in the upper timing diagram of FIG. 1. When the transmitted signal S1 is reflected from a target object, a corresponding received signal S2 is obtained. The transmitted and received signals S1, S2 are mixed, to obtain the result shown in the lower timing diagram of FIG. 1. As indicated, during each interval in which the signal S2 is being received concurrent with the signal S1 being transmitted, a beat signal component having a frequency (beat frequency) fb is obtained as a result of the signal mixing, where fb is the difference between the respective frequencies of the transmitted signal S1 and received signal S2. The value of the beat frequency varies in proportion to the delay time $\Delta t$ required for the transmitted signal transmitted waves to travel from the radar apparatus of the local vehicle to a target object and return to that radar apparatus. Hence, the distance to the target object can be calculated based on fb.

One method of measuring the direction of a target object is to utilize electronic scanning. This method enables scanning in all directions to be performed in a short time. Radar waves (transmitted electromagnetic waves) reflected back from a target object are received by a plurality of antenna elements of an array antenna, which are disposed in a specific position arrangement. Differences arise between the respective times at which the reflected waves are received by the antenna elements, is resulting in corresponding phase differences between the received signals from the antenna elements. The antenna signals are down-converted in frequency to obtain respective down-converted beat signals of respective channels (i.e., corresponding to respective antenna elements). Each of the beat signals is periodically sampled by an A/D converter to be converted to corresponding channel data, i.e., as channels signals. Phase differences between the channel signals (resulting from phase differences between the corresponding antenna element signals) can be used to detect the direction of the target object. One form of this method is known as DBF (digital beam-forming). With DBF, after A/D (analog to digital) conversion of the channel signals, the direction of a target object is obtained based on correlating the phase relationships of the channel signals with a mode vector which expresses the direction of arrival of received radar waves reflected from a target object. This is described for example in "Adaptive Signal Processing with Array Antennas", published in Japan by the Science Technology Publishing Co, referred to in the following as reference document 1.

With that electronic scanning method, data (sample values) are acquired concurrently for each of the channels by periodic sampling (A/D conversion operations). However this makes it necessary to utilize separate A/D converters for each of the channels, so that the apparatus becomes complex and expensive.

As illustrated in FIG. 5 of the drawings (described in detail hereinafter) it is known that a channel selector switch 7 can be used to perform switched selection of the respective signals from the plurality of antenna elements, i.e., for TDM (time-division multiplexing) reception of the antenna signals. This is described for example in reference document 1.

In that case, designating the number of an antenna element as k (i.e., as counted in the switching sequence from a 1st antenna element) there will be a switching delay $\tau$ between the signals of adjacent channels, i.e., with A/D sampling synchronized with the signal switching, there will be a switching delay $\tau$ between sampling respective signals of adjacent channels. Hence the timing of acquiring the antenna signal of the k-th antenna element will be delayed by an amount $k\tau$ with respect to the 1-st antenna element. If the maximum value of the switching delay $\tau[k]$ is negligible by comparison with the period of the beat signal (i.e., $\tau[k] \ll 1/fb$) then processing can be performed on the assumption that antenna signals are received concurrently from the respective antenna elements. However in practice, from reasons of cost, etc., it is generally necessary to use circuitry for the channels selector switch 7 that is only capable of relatively low-speed antenna signal switching, so that the channel selector switch 7 can only be operated at a relatively low drive frequency. Hence in general, the delay time $\tau[k]$ cannot be ignored Specifically, if the phase deviations between channel signals due to this switching delay are large, then the accuracy of detecting the direction of a target object will become lowered. Hence it is necessary to apply phase compensation to the channel signals by a phase amount $\Delta\phi[k]$ which is expressed as follows:

$$\Delta\phi[k] = 2 \cdot \pi \cdot f_B \cdot \tau[k] \tag{1}$$

Applying such phase compensation processing enables accurate direction detection to be achieved, even when multiplexing of antenna signals is utilized. However another problem exists, which will be described referring first to FIG. 2. Here, vehicles which are each equipped with an FM-CW radar apparatus are travelling in opposite directions to one another. Hence, a local vehicle 50 which is transmitting electromagnetic waves (radar waves) Tx receives radar waves Rx2 that are transmitted by a vehicle 52 which is running in an opposing traffic lane. The local vehicle 50 also acquires receives reflected radar waves Rx1, resulting from reflection of the radar waves Tx by a target object (a preceding vehicle 51).

Since the radar waves Rx2 are directly received by the local vehicle 50 from the transmitting source, they may be received at a substantially higher level of signal power than the reflected waves Rx1. Thus, accurate phase information cannot be obtained for the desired received signal components (resulting from the reflected radar waves Rx1), so that the direction of the target object cannot be estimated.

This problem can be overcome by suppressing the interference components. One method which has been proposed for achieving this utilizes a filter for suppressing frequency components corresponding to received electromagnetic waves which arrive from a specific direction. Such a method is described for example in a technical paper "Adaptive Mainbeam Jamming Suppression for Multi-Function Radars", by T. J. Nohara et al, referred to in the following as reference document 2. However with a time-division multiplexing type of radar apparatus, it may not be possible to accurately determine the arrival direction of the interference waves. The reasons for this will be described in the following.

When the interference waves Rx2 are generated from an FM-CW type of radar apparatus they vary linearly in frequency, as do the transmitted waves Tx from the local vehicle, as illustrated in FIG. 3A. As illustrated in FIG. 3B, when an antenna signal which results from receiving Rx1 and Rx2 is supplied to the signal mixer 10, the resultant down-converted signal (beat signal) S3 produced from the mixer will contain an interference component Ix resulting from the interference waves Rx2. During each interval in which the frequency of the interference component Ix is above the Nyquist frequency of the A/D converter, aliasing components will appear in the sampled channel signals (i.e., in the digital data which should express the channel signals). The aliasing components vary in frequency as illustrated in FIG. 3C.

In such a case, it may not be possible to use phase relationships between channel signals for detecting the direction of an interference source, for the purpose of suppressing an interference signal transmitted from that source, or to perform phase compensation for time delays between the signals of respective channels. This problem due to aliasing arises both for a FM-CW radar apparatus which utilizes concurrent reception (with separate A/D converters for the respective channels) and for a FM-CW radar apparatus which utilizes TDM of antenna signals (with a single A/D converter).

If the slopes of the respective FM-CW modulation characteristics (the frequency/time variation characteristics of Rx1, Rx2) are close to being parallel, then the frequency of the resultant interference component Ix will be correspondingly low. However if the slopes are substantially different, as in FIGS. 3A, 3B and 3C, then the frequency of the interference component Ix will exceed the Nyquist frequency for A/D conversion, causing aliasing to occur. In that case, the phase relationships between the channel signals prior to A/D conversion (i.e., prior to aliasing) will not correspond to those of the sampled channel signals. Thus, channel data thus obtained cannot be processed to obtain the direction of an interference source, so that the interference signal cannot be suppressed.

The reasons for this will be described referring to FIGS. 4A and 4B, showing waveforms of channel signals before and after sampling, when a large-amplitude interference component of each channel signal (before sampling) has a frequency that exceeds the Nyquist limit for aliasing at A/D conversion. Signals of three channels (channel 1, channel 2, channel 3) are shown, with channel 2 corresponding to the central element of an array antenna. FIG. 4A illustrates the case in which the channel signals are sampled concurrently at data timings 0, 1, 2, etc. Each full-line curve AS shows the waveform (i.e., locus of successive data values) of a sampled channel signal, while each broken-line curve BS shows the waveform of a channel signal before sampling. This example assumes that interference waves are received from a transmitting source located directly ahead of the local vehicle (the 0° direction) so that all of the before-sampling channel signals are in phase with the channel 2 signal.

It will be understood that in the case of FIG. 4A, if the direction of the received interference waves is other than the 0° direction, so that phase differences arise between the before-sampling channel signals BS at each of the time points 0, 1, 2, etc., these will not correspond to resultant phase differences between the sampled channel signals AS, due to the aliasing, so that the direction of an interference source cannot be estimated based on the sampled channel signals AS.

FIG. 4B illustrates the above for the case of TDM reception, causing the above-described switching delays τk. In FIG. 4B, the "x" symbols indicate the sampling timings of the TDM channel signals. In this case, although interference waves are again assumed to be received along the 0° direction, and although the switching delay time τ is predetermined, it is not possible to apply compensation for the switching delays to the after-sampling channel signals AS, due to the occurrence of aliasing. Due to this, and to the reasons described for FIG. 4A above, the direction of an interference source cannot be estimated, so that interference components in the after-sampling channel signals AS cannot be suppressed based on that direction.

For the above reasons, a technique fox suppressing such interference components in the channel signals has been proposed in U.S. patent publication No. 2008-0036645, designated as reference document 3 in the following, whereby when a time-axis interval of each of the sampled channel signals (A/D converted beat signals) has been converted to a corresponding channel data set comprising a fixed number of data values, a plurality of short data segments are extracted from each channel data set. The short data segments respectively correspond to sequential data timings, and the duration of each short data segment is sufficiently short that the interference component frequency does not change significantly within each short data segment. Respective frequency spectra of these short data segments are then obtained. A plurality of candidate values of frequency of the interference signal are then estimated for each of the short data segments, based on these frequency spectra, and DBF (digital beam forming) is then applied to obtain the most suitable candidate value, which is used to estimate the most probable direction of arrival of the interference waves. That information is then used in suppressing the interference components in the channel signals.

However with the method of reference document 3, it is necessary to derive a plurality of candidate values of pre-aliasing frequency of the interference component, and to perform DBF processing based on each of these candidate values, In particular, if it is necessary to use a relatively high value of cut-off frequency for low-pass filtering that is applied prior to A/D conversion, then the number of candidate values of pre-aliasing frequency will be large. Hence, the required number of calculation operations becomes excessive, and since a radar apparatus which performs real-time processing must execute that processing at high speed, it becomes necessary to use a plurality of high-performance processors with respective calculation programs and calculation units.

SUMMARY OF THE INVENTION

It is an objective of the present invention to overcome the above problems, by providing a FM-CW or FM type of electronic scanning radar apparatus whereby interference of the type described above can be suppressed while requiring only a simple apparatus configuration.

To achieve the above objective, the invention provides an electronic scanning radar apparatus comprising:

a transmitting antenna driven by a transmission signal to transmit FM-CW or CW electromagnetic waves, a receiving antenna comprising a plurality of antenna elements, a signal mixer for mixing received signals of a plurality of channels respectively corresponding to the antenna elements with the transmission signal, to derive respective beat signals of the channels, A/D converter circuitry for sampling and quantizing each of the beat signals with a fixed sampling frequency, to convert the beat signals to respective channel signals and store successive intervals of the channel signals as respective channel data sets, each of the channel data sets comprising a fixed number of data values corresponding to respective data timings, circuitry for extracting a plurality of short data segments from each of the channel data sets, each of the short data segments comprising a fixed plurality of data values, interference component detection circuitry configured to derive respective frequency spectra corresponding to the short data segments, and to obtain from the frequency spectra a plurality of momentary frequency values of an interference component of the channel signals, the momentary frequency values respectively corresponding to the data timings, interference suppression circuitry configured to process the momentary frequency values in conjunction with the channel data sets, for detecting a direction of a source of transmitted electromagnetic waves corresponding to the interference component, and removing components of the channel data sets corresponding to the detected direction, to thereby obtain respective interference-suppressed channel data sets, and direction estimation circuitry configured to process the interference-suppressed channel data sets for estimating a direction of arrival of electromagnetic waves reflected from a target object.

With the present invention, such a radar apparatus is characterized in comprising:

phase compensation table generating circuitry configured to derive a plurality of sets of phase compensation values, with the sets corresponding to respective data timings and with the phase compensation values within each of the sets corresponding to respective channels;

interference phase adjustment circuitry configured to process the channel data sets in accordance with the phase compensation values, to shift respective interference components of the channels to a predetermined phase relationship corresponding to a predetermined direction of arrival of received electromagnetic waves;

interference removal circuitry configured in accordance with the predetermined phase relationship, for removing the phase-shifted interference components from the channel data sets; and phase restoration circuitry configured to restore received signal components expressed by the channel data sets to a phase condition existing prior to the phase shifting.

With such a radar apparatus, since the respective phases of the interference components of each of the channels are always shifted to a fixedly predetermined relationship, irrespective of the direction of arrival of the radar waves which are causing the interference, the interference components can be readily suppressed, i.e., an identical processing procedure is always performed to suppress the interference components, irrespective of the direction of arrival of the interference radar waves. It is made unnecessary to calculate a plurality of candidate values of momentary frequency of the interference components, for each of respective data timings, as is proposed in the related prior art of reference document 2 above. In particular, since the respective phases of the interference components of each of the channels are always shifted to a fixedly predetermined relationship corresponding to a predetermined direction of an interference source, i.e., it is not necessary to determine the actual direction, the operation is unaffected by occurrence of aliasing at A/D conversion.

The predetermined direction of arrival of interference electromagnetic waves can be advantageously set as the 0° (straight-ahead) direction, in which case the predetermined phase relationship of the interference components of respective channels is a phase-synchronized condition, where the term "phase-synchronized" is used herein to signify a condition in which respective signal values of the channels are identical at each of successive time points. In that case, the interference components can readily be removed, as a common-mode component of the phase-shifted channel signals.

The invention can be applied to a radar apparatus in which the antenna signals of the antenna elements are supplied to respective signal mixers, with resultant beat signals being sampled by respective A/D converters. It can equally be applied to a radar apparatus which utilizes TDM reception, with a switch (multiplexer) connected between the receiving antenna elements and a single signal mixer, for successively selecting the antenna signals of respective channels to be supplied to the mixer, so that (due to switching delays) the phase relationships of signal components of respective channels do not directly correspond to an actual direction of arrival of received radar waves.

BRIEF DESCRIPTION OF THE DRAWINGS

FIG. 10 is a diagram for illustrating a basic processing sequence that is executed with the present invention, for removing interference components from A/D converted beat signals of respective channels.

DESCRIPTION OF PREFERRED EMBODIMENTS

Figure 5:
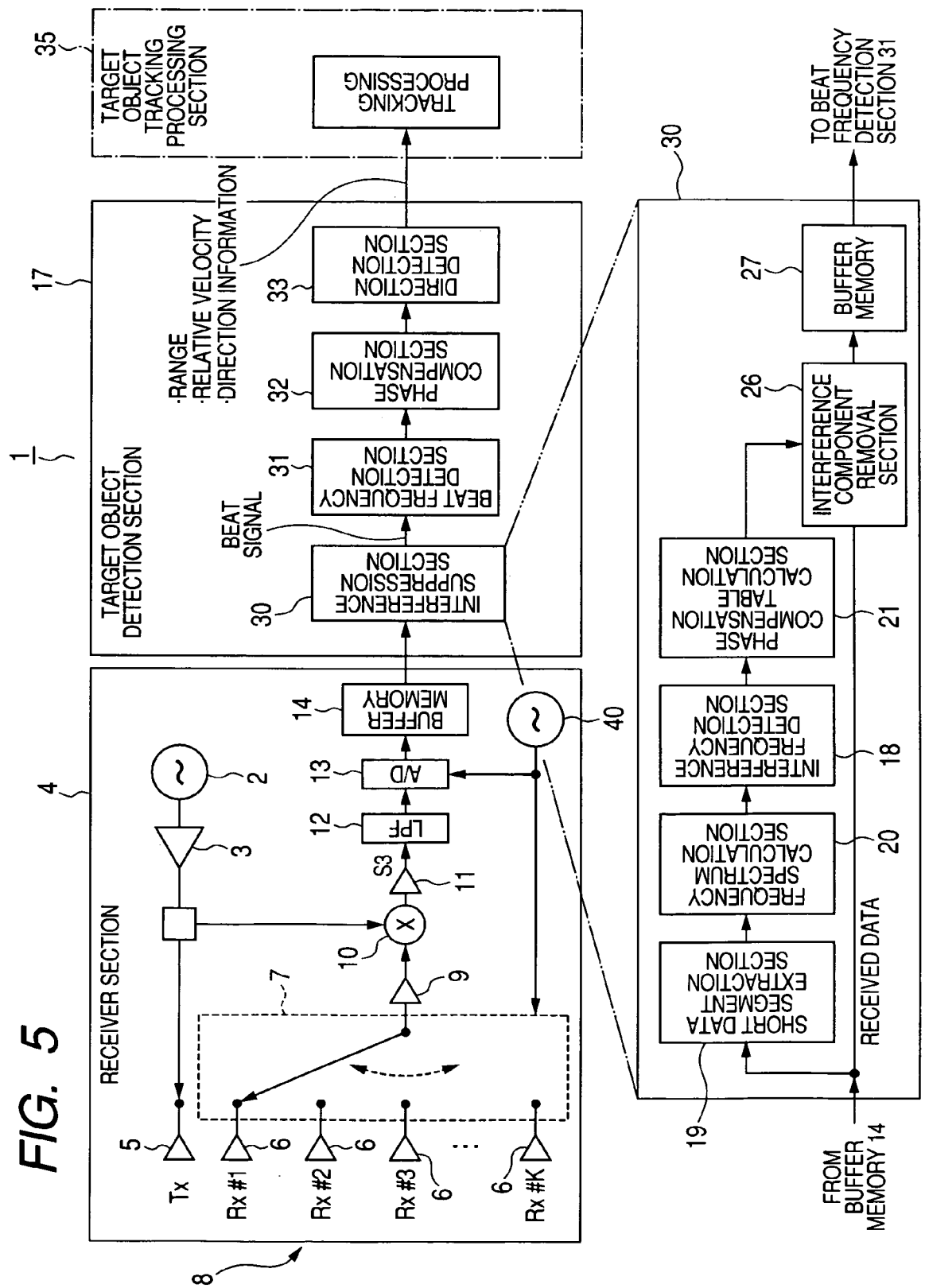
FIG. 5 is a block diagram showing the overall configuration of an embodiment of an electronic scanning radar apparatus.

FIG. 5 is a block diagram showing the overall configuration of an embodiment of an electronic scanning radar apparatus, denoted by numeral 1. This is a FM-CW type of radar apparatus, which utilizes modulation of continuous electromagnetic waves (CW) by a transmission signal Tx, using frequency modulation (FM). The electronic scanning radar apparatus 1 is installed on a vehicle, and serves to detect the distance and relative velocity of a target object that is travelling ahead of the vehicle, and the direction to that target object. The detection results obtained by the electronic scanning radar apparatus 1 are used as information for controlling the running of the vehicle, etc. The transmitted waves are in the microwave frequency range.

As shown, the electronic scanning radar apparatus 1 includes a receiver section 4, a target object detection section 17, and a target object tracking processing section 35. The target object detection section 17 includes a interference suppression section 30, whose functions are indicated as respective circuit sections in FIG. 6. However with this embodiment, these function are implemented by processing operations executed by a microcomputer (i.e., having a CPU, RAM, ROM etc.) in accordance with a stored program. The receiver section 4 includes a transmission signal source which in this embodiment is a VCO (voltage control oscillator) 2, an amplifier 3 and a transmitting antenna 5. As described above, the receiver section 4 also includes a set of K antenna elements 6 of an array antenna 8, and also an amplifier 9, a signal mixer 10, an amplifier 11, a LPF (low-pass filter) 12, a A/D converter 13, a buffer memory 14 and a VCO 40.

Figure 1:
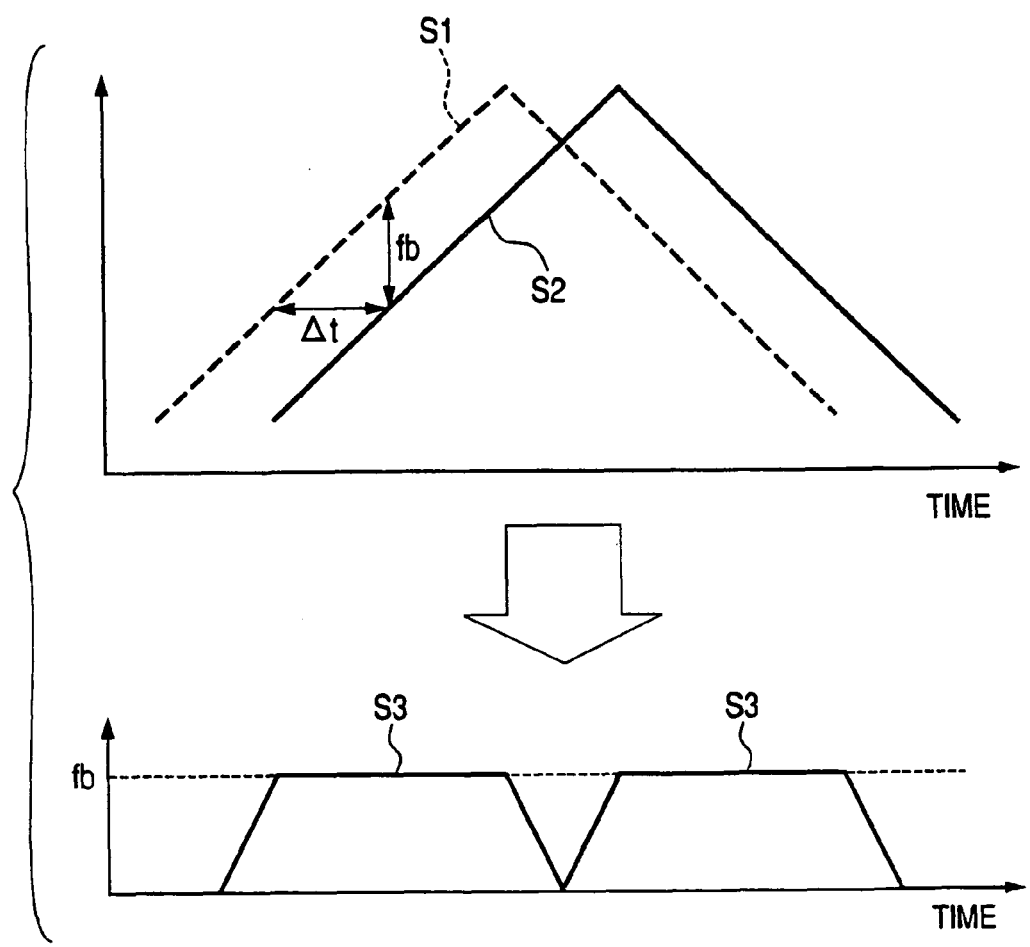
FIG. 1 is a timing diagram for describing transmitted and received signals, and effects of signal mixing, with a FM-CW or CW electronic scanning radar apparatus.
Figure 2:
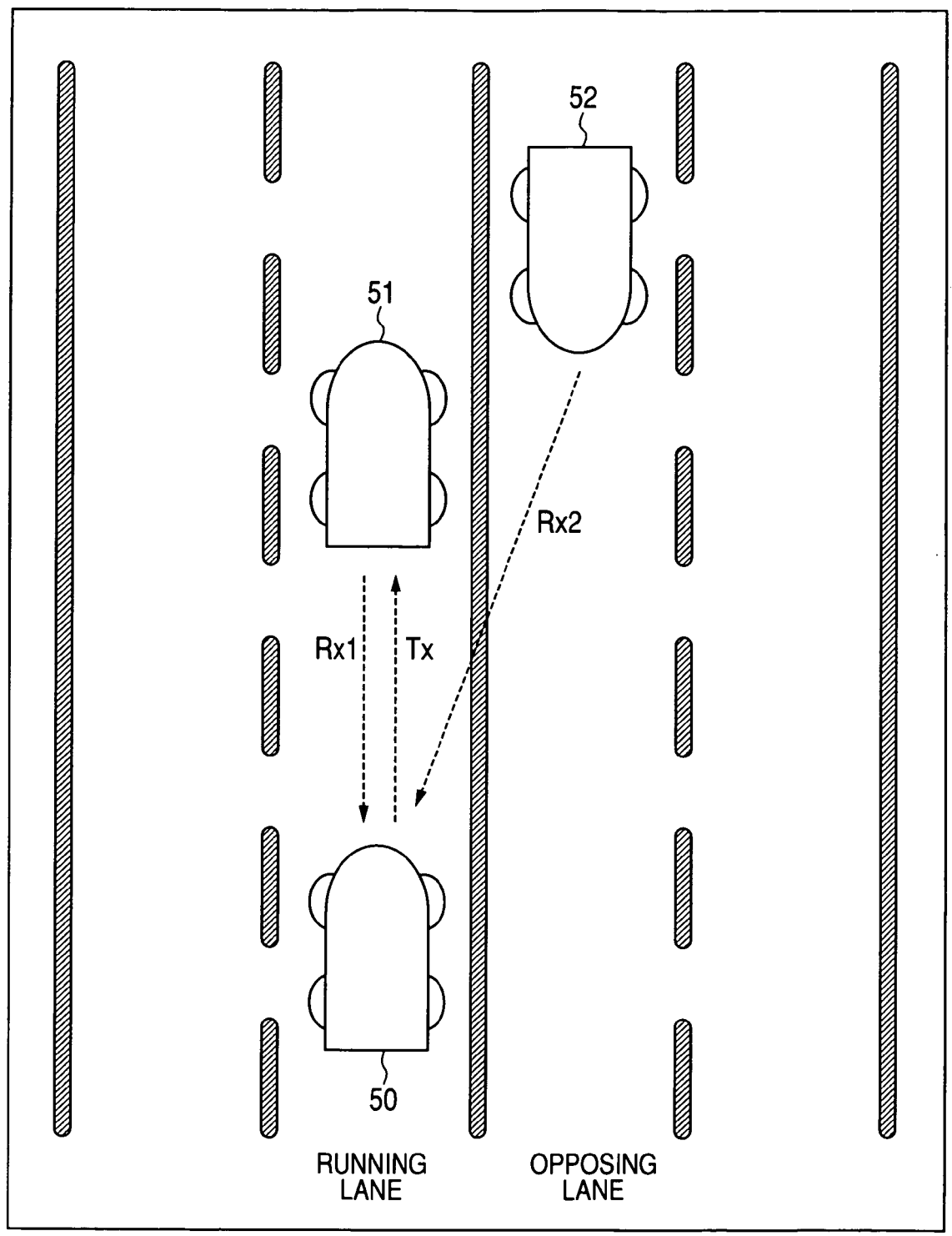
FIG. 2 is a conceptual plan view of a traffic environment in which vehicles are driving in opposing lanes.
Figure 3A:
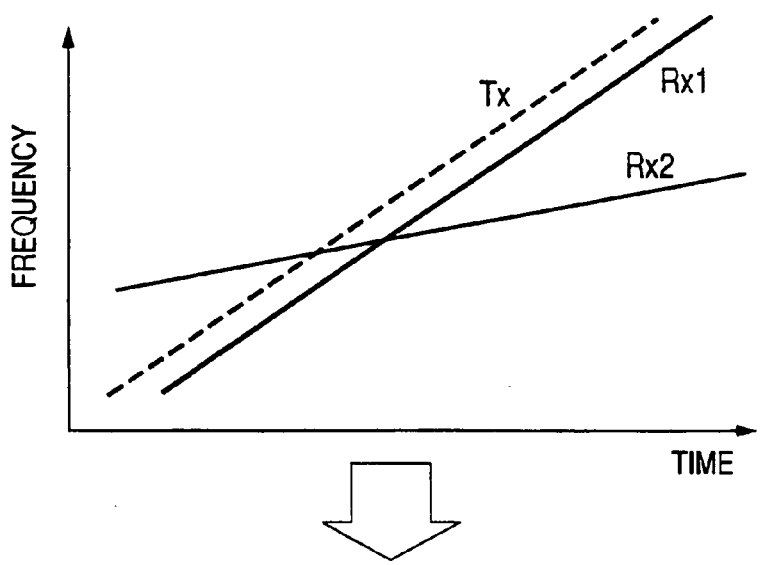
FIGS. 3A, 3B and 3C illustrate transmitted and received signals of a prior art type of vehicle-installed radar apparatus, for a case in which FM-CW interference radar waves transmitted from another vehicle are received.
Figure 3B:
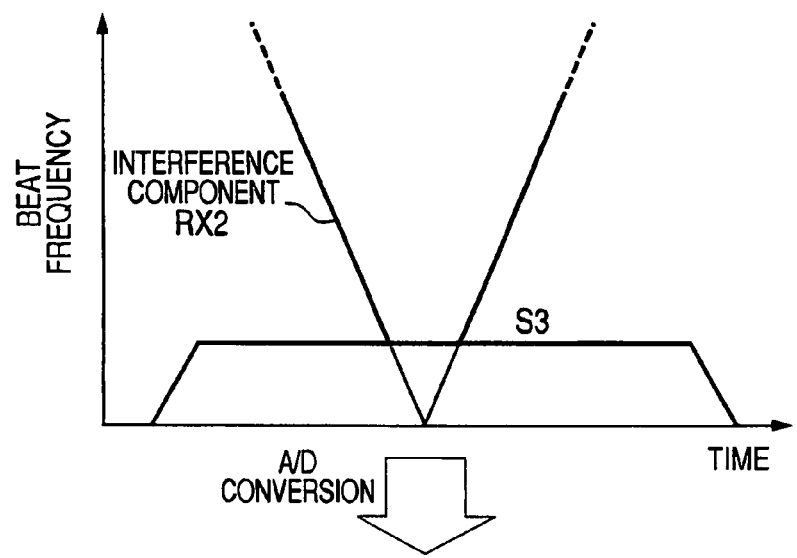
Figure 3C:
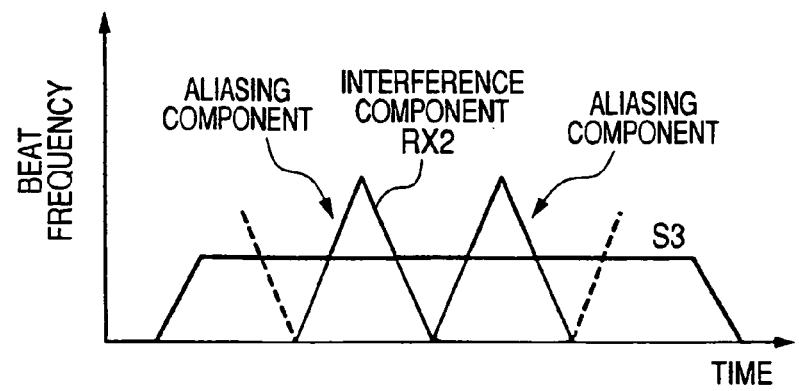

The VCO 2 generates a frequency-modulated carrier signal having a center frequency f0 of, for example, 76 GHz, under the control of a variable DC voltage that is applied as a modulation signal from a modulation signal source (not shown in the drawings). The modulation signal has a variation of the triangular form shown in diagram (a) of FIG. 1, with the transmission signal Tx (modulated carrier signal) having a modulation degree Δf with respect to the center frequency f0, i.e., the frequency of the modulated carrier varies between f0±Δf/2. The transmission signal Tx is amplified by the amplifier 3 and transferred via a signal splitter 41 to the transmitting antenna 5, to be transmitted as electromagnetic waves. The splitter 41 transfers a part of the transmission signal Tx to the signal mixer 10, to function as the local oscillator signal.

The antenna elements 6 supply K received signals Rx of K channels, i.e., the channel selector switch 7 has K input terminals respectively connected to the antenna elements 6 and a single output terminal. The channel selector switch 7 is performs repetitive switching under the control of a switching signal (clock signal) generated by a VCO (voltage control oscillator) 40 at a frequency fsw, to perform TDM (time-division multiplexing) of the K channel signals Rx from the receiving antenna 8, with a period of 1/fsw. With this embodiment, the switching Is performed by the channel selector switch 7 electronically, i.e., within a circuit.

The VCO 40 also synchronizes the data A/D conversion sampling timings with the switching of the received signals Rx. The output TDM signal from the channel selector switch 7 is inputted to the series-connected amplifier 9, signal mixer 10 and amplifier 11, with the output signal from the amplifier 11 being inputted to the A/D converter 13. After being amplified by the amplifier 9, the output signal from the channel selector switch 7 is mixed with the transmission signal Tx in the signal mixer 10, to be down-converted in frequency. TDM beat signals of respective channels are thereby produced obtained from the signal mixer 10. Such derivation of beat signals is described for example in Japanese patent publication No. 11-133142.

With triangular-wave FM-CW modulation, designating fr as the beat signal frequency that is obtained when the relative velocity of a target object is zero, fd as a doppler frequency which is obtained based on the relative velocity of a target object, fb1 as the beat signal frequency during each up interval (i.e., in which the beat frequency is increasing), and fb2 as the beat frequency during each down interval (i.e., in which the beat signal frequency is decreasing) the following equations (2) and (3) can be obtained:

$$fb1=fr-fd \quad (2)$$

$$fb2=fr+fd \quad (3)$$

Hence, if the beat frequency is measured during an up interval and a down interval, the values of fr and fd can be obtained from the following equations (4) and (5).

$$fr=(fb1+fb2)/2 \quad (4)$$

$$fd=(fb2-fb1)/2 \quad (5)$$

Thus, the distance R and relative velocity V of a target object can be obtained from the following equations (6) and (7):

$$R=(C/(4 \cdot \Delta F \cdot fm) \cdot fr \quad (6)$$

$$V=(C/2 \cdot f0)) \cdot fd \quad (7)$$

Here, C is the speed of light, and fm is the FM modulation frequency.

The TDM beat signals from the signal mixer 10 are transferred via the amplifier 11 and the LPF 12 to the A/D converter 13 to obtain the respective channel signals described above, as channel data (digital data) formed of successive data values. The channel data are stored in the buffer memory 14, and when a set of N data values has become stored for each of the K channels, where N is a fixed plural number, the (N×K element) data set is supplied to the target object detection section 17 to be processed Such a data set will be designated as DT1, and can be represented as follows:

$$\begin{pmatrix} x[1][1] & \cdots & x[1][N] \\ \vdots & \ddots & \vdots \\ x[K][1] & \cdots & x[K][N] \end{pmatrix} \quad (8)$$

As shown in FIG. 5, the target object detection section 17 includes an interference suppression section 30, a beat frequency detection section 31, a phase compensation section 32 and a direction detection section 33. The interference suppression section 30 includes a short data segment extraction section 19, a frequency spectrum calculation section 20, a interference frequency detection section 18, a phase compensation table calculation section 21, a interference component suppression section 26 and a buffer memory 27.

Figure 4A:
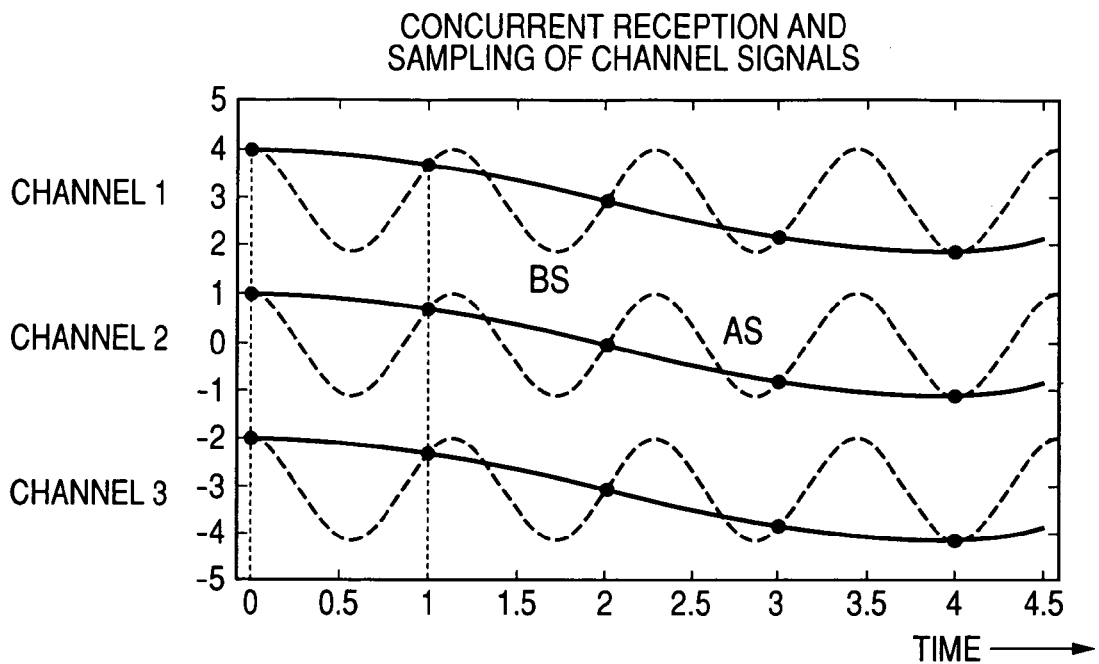
FIGS. 4A and 4B illustrate interference components in beat signals of respective channels before and after A/D conversion of the signals, when interference waves are received from a direction directly ahead and aliasing occurs, for the case of concurrent reception (concurrent A/D sampling for each channel) and TDM reception, respectively.
Figure 4B:
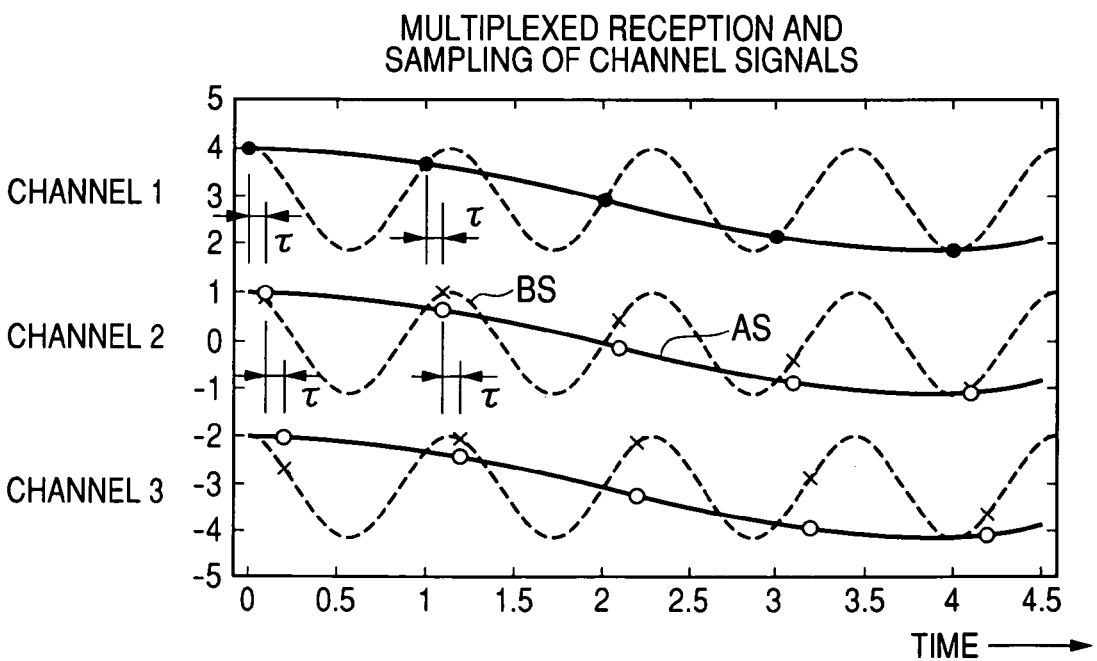
Figure 6:
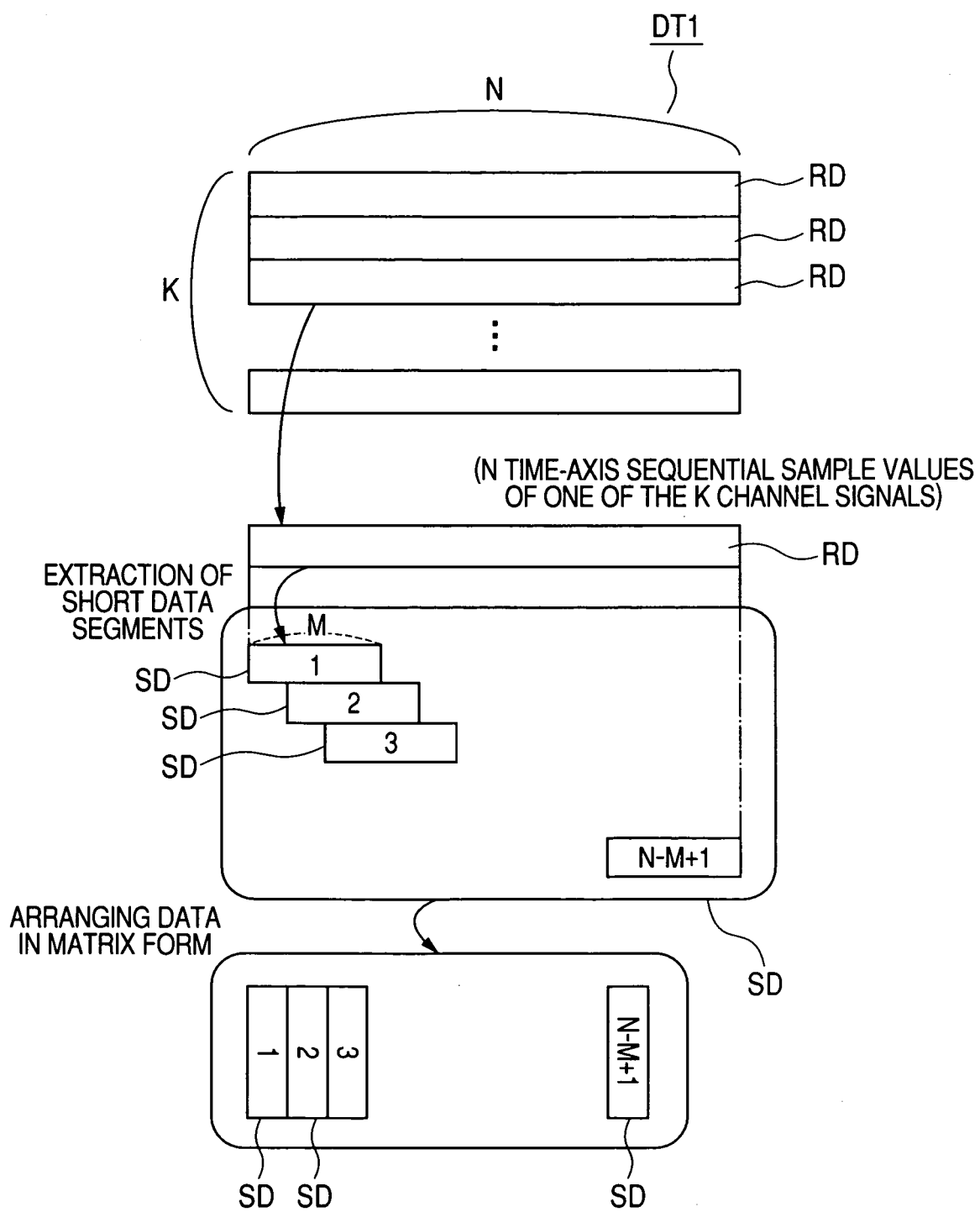
FIG. 6 is a conceptual diagram for illustrating processing for extracting short data segments from data of respective channels, in the embodiment of FIG. 5.

A stored data set DT1 is conceptually represented in FIG. 6. The respective sets of received channel data corresponding to the K channels each consist of N data values, and are designated as RD in FIG. 6. Within each received data set RD, successive positions from left to right in FIG. 6 correspond to successive data timings t, numbered from 1 to N. The term "data timings" as used herein in relation to the data of the channel data sets RD has the following significance. Referring to FIG. 4B for example, if the data timings (t) 1, 2, 3, etc., with respect to the data of channel 1 of FIG. 4B respectively correspond to the sampling time points 1, 2, 3, etc., shown in FIG. 4B, then the data timings (t) 1, 2, 3, etc., with respect to channel 2 respectively correspond to the sampling time points (1+τ), (2+τ), (3+τ), etc. Similarly, the data timings (t) 1, 2, 3, etc., with respect to channel 3 of FIGS. 4A and 4B respectively correspond to the sampling time points (1+2π), (2+2π), (3+2π), etc.

A total of (N−M+1) short data segments SD, each formed of M data values (where M is a fixed value that is less than N) corresponding to successive data timings t, are extracted from each received data set RD by the short data segment extraction section 19 of the interference suppression section 30. With this embodiment, the sequentially extracted short data segments SD from a data set RD sequentially overlap such as to be successively shifted by one data value (i.e., one data timing). However it would be equally possible to shift each short data segment with respect to the preceding segment by a different number of units.

As can be understood from FIG. 6, the short data segments SD of each received data set RD respectively commence at data timings from t=1 to (N−M+1). The short data segments obtained from a set of stored data DT1 can be represented by the following expression:

$$\begin{pmatrix} x[k][1] & \cdots & x[k][t] & \cdots & x[k][N-M+1] \\ x[k][2] & \cdots & x[k][t+1] & \cdots & x[k][M-M+2] \\ \vdots & \ddots & \vdots & \ddots & \vdots \\ x[1][M] & \cdots & x[k][t+M-1] & \cdots & x[k][N] \end{pmatrix} \quad (9)$$

$$k = 1 \ldots K$$
$$t = 1 \ldots N - M + 1$$

Figure 7:
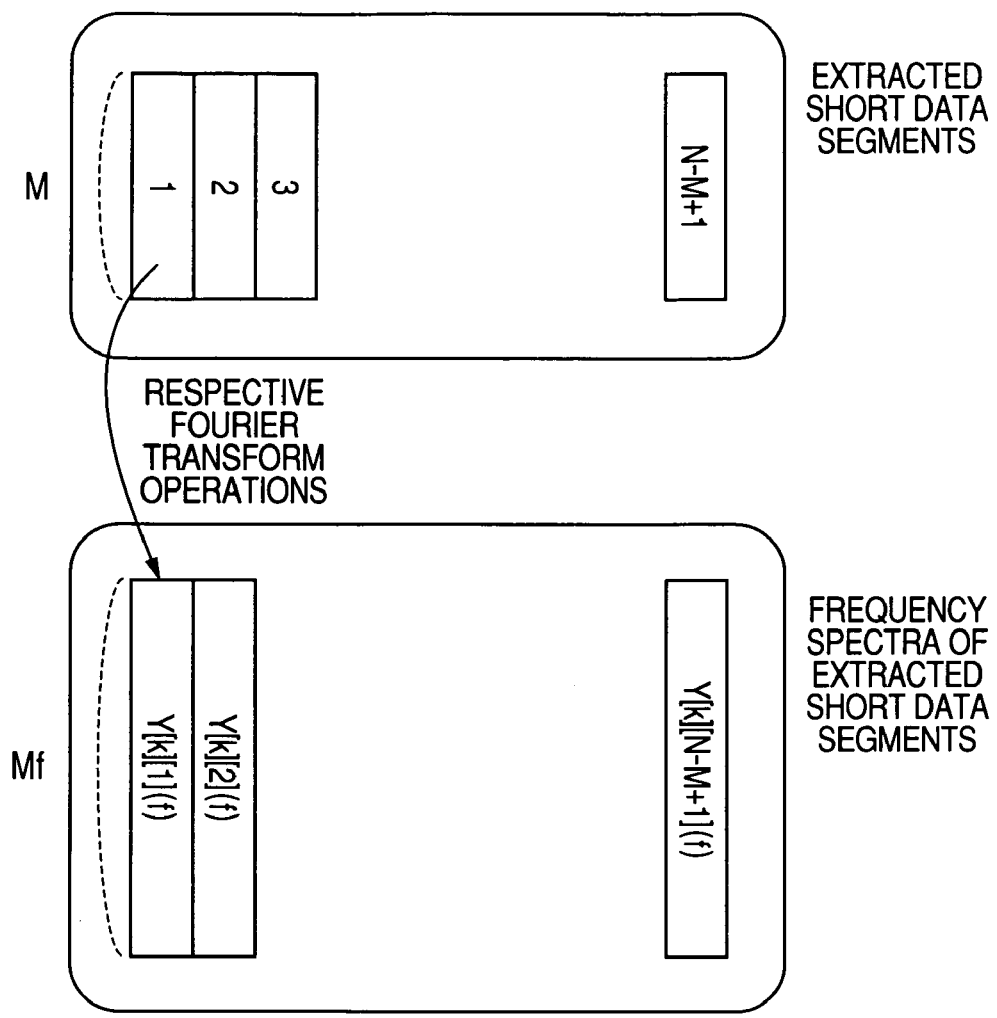
FIG. 7 is a conceptual diagram for illustrating processing for deriving respective frequency spectra of short data segments.

As each short data segment SD is outputted from the short data segment extraction section 19, the frequency spectrum calculation section 20 applies DFT (discrete Fourier transform) processing, to obtain a corresponding frequency spectrum of that short data segment. The frequency spectra thus obtained for the short data segments SD of a received data set RD are illustrated conceptually in FIG. 7. These frequency spectra respectively corresponding to the short data segments SD of each channel of a received data set DT1 can be represented by the following expression (10).

$$(Y[k](1)(f) \ldots Y[k][t](f) \ldots Y[k][N-M+1](f)) \quad (10)$$

The interference frequency detection section 18 calculates the average of the power levels of the frequency spectra (DFT results) of each set of K short data segments SD of respective channels. The frequency at which the signal power reaches a peak, with respect to the calculated average power level, is then detected, as a momentary beat frequency.

Figure 8:
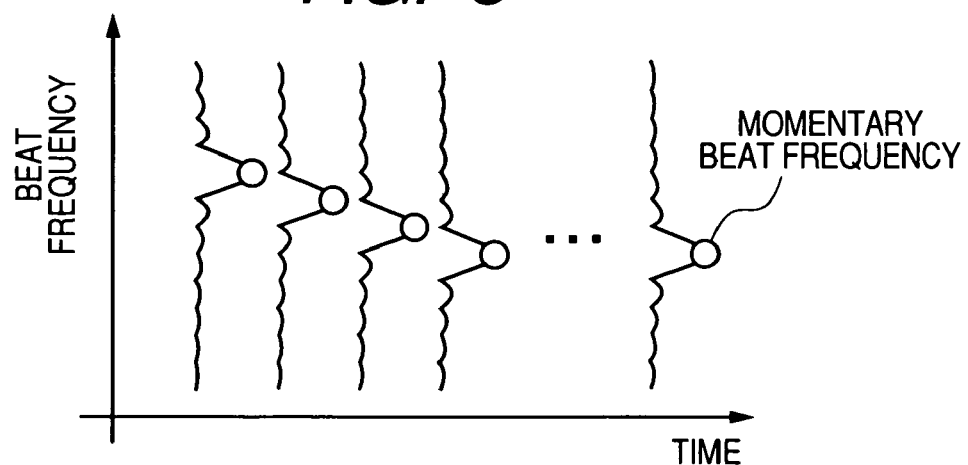
FIG. 8 is a conceptual diagram for illustrating momentary frequency values of interference frequency components, corresponding to respective time points.

The derivation of the momentary beat frequencies $f_{BA}[t]$ from (N−M+1) sets of K short data segments SD, with the sets respectively commencing at data timings t=1 to (N−M+1), is illustrated conceptually in FIG. 8. This can be expressed as:

$$f_{BA}[t], (t=1 \ldots N-M+1) \quad (11)$$

Figure 9:
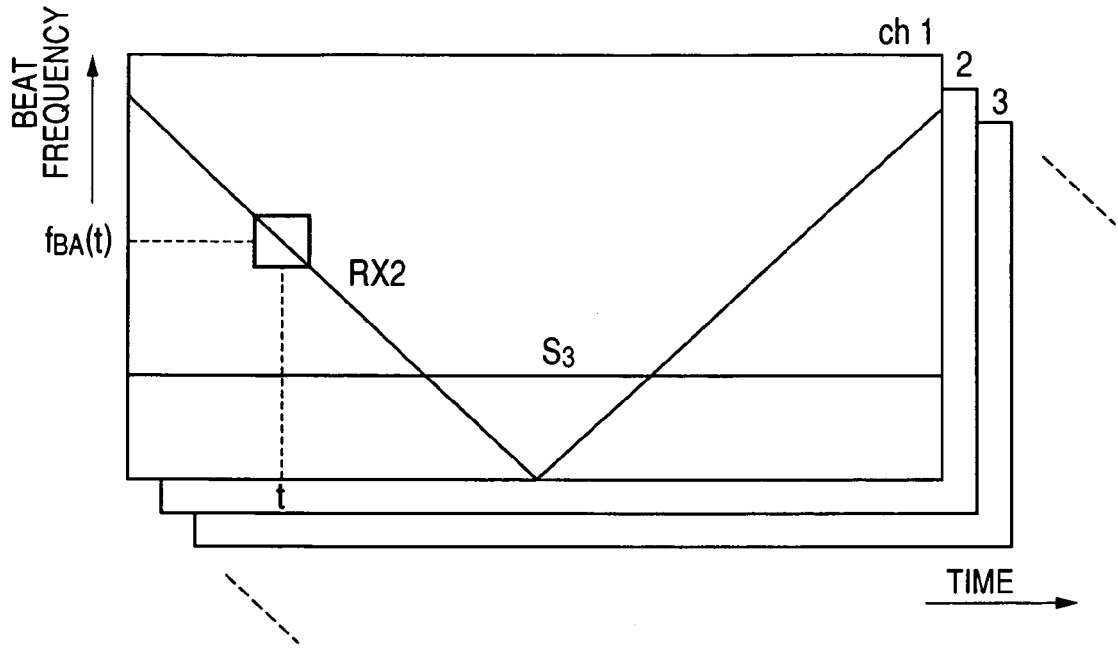
FIG. 9 is a conceptual diagram for illustrating the principles of the present invention.
Figure 9:

The relationship of the momentary beat frequency values $f_{BA}[t]$ to the time-axis variations in frequency of the interference component Rx2 and desired received signal component S3 of each channel is illustrated conceptually in FIG. 9. As described above, when an interference component is received as directly transmitted radar waves, the amplitude of the interference components in the channel signals will be substantially higher than that of the required signal components. Hence, the momentary frequency values derived based on peak values of received power as described above, can be assumed to be momentary frequency values of an interference component. In addition as illustrated in FIG. 9, frequency values of a required received signal component are not overlapped in most of the processing time with the frequencies of the interference components, since the frequency value of an interference component varies over time.

The derivation of the momentary beat frequency values (momentary frequency values of interference component) $f_{BA}[t]$ can be expressed as follows;

$$f_{BA}[t] = \arg\max_{f} \left( \frac{1}{K} \sum_{k=1}^{K} |Y[k][t](f)|^Z \right), t = 1 \ldots N - M + 1 \quad (12)$$

Each of the data values (momentary amplitude values) constituting the data set DT1, corresponding to a specific data timing t, can thereby be related to a specific momentary interference component frequency. A complex frequency spectrum vector, corresponding to a momentary frequency value at a timing t, is thereby obtained, i.e.:

$$Y[\ ][t](f_{BA}(t)) = [Y[1][t](f_{BA}(t)) \ldots Y[K][t](f_{BA}(t))]^T \quad (13)$$

In equation (13), the suffix T denotes the matrix transpose.

The elements of this complex frequency spectrum vector can be converted to polar coordinate form, i.e., with each element becoming a vector quantity formed of an amplitude term (vector magnitude) $a_i$ and phase term $e^{j\Theta i}$, so that equation (13) can be expressed as:

$$Y[\ ][t](f_{BA}(t)) = [a_1 e^{j\Theta_1} a_2 e^{j\Theta_2} \ldots a_K e^{j\Theta_K}]^T \quad (14)$$

A phase compensation table designated as Hosei[t] expressed by equation (15) below is obtained from the respective phase terms of equation (14). This table consists of a plurality of sets of K phase compensation values, with the compensation values within each set respectively corresponding to the K channels and with the sets respectively corresponding to successive data timings t.

$$Hosei[t] = [e^{-j\Theta_1} e^{-j\Theta_2} \ldots E^{-j\Theta_K}]^T \quad (15)$$

It can be understood that each of the phase terms in equation (14) can be set to 1 (i.e., phase angle converted to zero) through multiplication by the corresponding phase term (phase compensation value) of the phase compensation table Hosei[t].

With the present invention, such a phase compensation table is used to convert the phase relationship of the interference components in the channel signals to correspond to one predetermined direction of arrival of interference waves, irrespective of the actual direction of arrival of the interference waves. With this embodiment, the predetermined direction is the 0° direction. That is, a phase-synchronized relationship of the respective interference components of the channel signals is established (of the form illustrated by diagram (a) of FIG. 4 above).

Thus with the present invention, since the interference components in the channel signals are always shifted to a fixedly predetermined phase relationship corresponding to a predetermined direction of a source of interference radar waves, irrespective of the actual direction, the interference components can be removed by simpler processing than is possible in the prior art.

Specifically, all components of the channel signals (as represented by the channel data) are phase-shifted by employing the phase compensation table Hosei[t], to achieve the above phase relationship of the interference components of the channel signals. The interference components are then removed, as a common-phase component of the channel signals (with this embodiment, a common-phase component is equivalent to an average value of the channel signals), and all of the remaining components of the channel signals are then restored to their original phase conditions.

FIG. 10 conceptually illustrates this, for channel signals each containing a desired signal component SC and an interference component KC at some specific data timing t, with the respective amplitudes of these components at that timing being indicated by the lengths of the arrows and the respective phase angles (determined with respect to the momentary frequencies of the interference component KC and the desired component SC at that specific data timing) being indicated by the angles of the arrows. It should be understood that FIG. 10 is intended only as a conceptual diagram, and is not intended to show an example of actual signal conditions.

Initially, the phase relationships of the signal components of the respective channels are as illustrated in step S1. In step S2, for each channel signal, a time axis shift is applied to each of the values constituting that channel signal, with the amount of shift being such that the phase angle of the interference components KC is shifted to a predetermined value, which with this embodiment is 0°. This shift results in a corresponding change in phase angle of the desired signal component SC of each channel signal.

The interference component KC in each of these channel signals is thereby shifted to a predetermined phase angle, which with this embodiment is 0° (this can alternatively be considered as setting the phase differences between the channel signal 1 and each of the other channel signals to 0°). As described above, the resultant phase-synchronized condition of the interference components in the respective channel signals corresponds to reception of interference radar waves from the 0° direction.

The interference component in each channel signal is then removed, in step S3 of FIG. 10, by processing which is performed in accordance with the predetermined (apparent) interference source direction of step S2, i.e., with this embodiment, the 0° direction.

It will be understood that with the present invention, since the (apparent) interference source direction is fixedly predetermined, it is not necessary to alter the contents of the processing of step S3 in accordance with various different actual directions of arrival of interference waves, thereby simplifying the necessary processing.

Next, in step S4, the phase of the desired signal component SC of each channel signal is restored to its original condition, by an inverse phase shift to that of step S2. In that way, the desired signal components SC of the channel signals are recovered with their original phase relationships, with the interference components KC removed.

When the 0° direction has been established as the (apparent) direction of arrival of the interference radar waves, the interference component in each channel (i.e., interference components expressed in the respective received data sets RD) can be suppressed by a simple matrix calculation operation, as described in the following.

All of the above processing, can be performed during signal reception by the radar apparatus.

Specifically, the received data DT1 are expressed as data $x_c[t]$, consisting of sets of K data values, with the data values of each set respectively corresponding to the K channels, and with the sets respectively corresponding to successive ones of the data timings t. Hence, $x_c[t]$ can be expressed as follows:

$$x_c[t]=(x[1][t]x[2][t]\ldots x[K][t])^T \qquad (16)$$

Suppression of the interference component of each channel, is performed by the interference component suppression section 26 for the data of each of the timings t, through the following calculation:

$$\text{diag}(\text{Hosei}[t]^*)\cdot I-a(0)\cdot a(0)^T)\cdot \text{diag}(\text{Hosei}[t])\cdot x_c[t] \qquad (17)$$

In the above, the "*" symbol indicates the complex conjugate, "I" denotes a unit matrix of size K, i.e., having K elements, and a (0) denotes the mode vector (size K) corresponding to the 0° direction, which can be expressed as follows:

$$a(0)=1/\sqrt{K}[1\ 1\ \ldots\ 1]^T \qquad (18)$$

In executing the calculation of expression (17), the interference component suppression section 26 performs the steps S2 to S4 of FIG. 10 (for each of the sets of channel data values corresponding to the data timings t) by three successive matrix multiplication operations. Firstly, a multiplication operation using Hosei[t] (multiplying elements of $x_c[t]$ by corresponding elements of Hosei[t]) to obtain a corresponding matrix of vector quantities, corresponds to step S2 of FIG. 10.

Next, multiplication using the projection matrix $(I-a(0)\cdot a(0)^T)$, to remove the common-mode component of the vector magnitudes (with this embodiment, a common-mode component is equivalent to an average value of the vector magnitudes), i.e., a component corresponding to the 0° direction of the interference source, thereby suppressing the interference components expressed in the data $x_c[t]$. This corresponds to step S3 of FIG. 10. The resultant matrix is then operated on by multiplication using diag(Hosei[t]*). This has the effect of restoring the phase of each remaining signal component to its original value and so corresponds to step S4 of FIG. 10.

It should be noted that it would be possible to shift the interference components of the channel signals to a phase relationship corresponding to a direction of arrival of interference waves from a direction other than the 0°, in the processing described above. The essential point is that a phase compensation table is used to establish a predetermined phase relationship between interference components of the channel signals (as represented by the channel data). That predetermined phase relationship corresponding to a predetermined (apparent) arrival direction of interference radar waves, and is established irrespective of the actual arrival direction, irrespective of whether or not aliasing is occurring at A/D conversion, and irrespective of the effects of antenna element switching delays in the case of TDM reception.

As a result, interference components in the received signals of respective channels can be removed by simple calculation operations, in particular if the predetermined phase relationship of the interference components is made to correspond to the 0° direction of the interference source as described above.

In practice, it may be preferable to utilize the calculation of expression (19) below, to obtain the results described for expression (17). In expression (19), the H suffix denotes the conjugate transpose. The calculation of expression (19) is executed as the indicated sequence of operations, performed successively, starting from the end of the expression. Use of this algorithm can reduce the processing performance requirements, and thereby reduce costs.

$$\underbrace{\underbrace{(I - \frac{1}{K} \underbrace{Hosei[t] \cdot Hosei[t]^H}_{\text{FIRST CALCULATION}}) \cdot x_c[t]}_{\text{SECOND CALCULATION}}}_{\text{THIRD CALCULATION}} \tag{19}$$

As the sets of channel data Xc[t] corresponding to respective data timings t are successively processed to remove the interference components as described above, the processed (interference-suppressed) channel data are cumulatively stored in the buffer memory 27, to be thereafter supplied to the beat frequency detection section 31.

It can thus be understood that by the processing described above, the interference suppression section 30 derives channel data that are free from interference components which are caused by directly receiving FM-CW or CW radar waves transmitted from another vehicle.

As can be understood from the above description, with the present invention, it is unnecessary to establish a phase relationship between the interference components in the channels signals that corresponds to the actual direction from which the interference waves are being received. Hence it becomes unnecessary to perform complex processing for deriving and evaluating a plurality of candidate pre-aliasing frequency values, in order to obtain a probable direction of arrival of interference radar waves when aliasing is occurring at D/A conversion, as proposed in the prior art. This is made possible since with the present invention, the phase relationship between the interference components in respective channel signals (as represented by received data held in the buffer memory 14) is always converted to correspond to a single predetermined direction of arrival of interference radar waves. The processing for removing the interference components can thereby be made simple, eliminating the need for high-speed data processing equipment to perform the necessary calculations etc.

In the target object detection section 17, the beat frequency detection section 31, phase compensation section 32 and direction detection section 33 apply known types of processing to the received signal data from which the interference component has been removed, to thereby calculate the distance, relative velocity and relative direction, etc., of a target object which precedes the vehicle in which the electronic scanning radar apparatus 1 is installed.

The target object tracking processing section 35 shown in FIG. 5 performs calculation processing to perform tracking along the time axis, to detect a preceding vehicle. Processing that could be executed by the target object tracking processing section 35 for that purpose are known in the prior art, being described for example in Japanese patent publication No. 2003-270341, so that detailed description is omitted.

The processing executed by the beat frequency detection section 31, the phase compensation section 32 and the direction detection section 33 can be in accordance with known methods, for example as described in detail in reference document 1 referred to above, so that detailed description is omitted.

The above embodiment has been described assuming that the processing sections and their operation contents are implemented by signal processing software (program) which controls a microcomputer. However it would be equally possible to implement these in dedicated hardware form, within an integrated circuit such as a FPGA (field-programmable gate array) or LSI (large-scale integrated circuit).

Furthermore, with the above embodiment, the A/D converter 13 is configured to perform sampling and quantization of a single signal that is obtained by multiplexing the respective received signals from a plurality of antenna elements 6 of an array antenna 8, using the channel selector switch 7. However the invention would be equally applicable to a system in which the channel selector switch 7 is not utilized, and in which respective A/D converters such as the A/D converter 13 are provided for each of the antenna elements, i.e., in which concurrent reception and sampling of each channel is performed. In that case, the interference components would be removed from the respective channel signals (sampled beat signals) that are obtained from the A/D converters and stored as received data.

With the present invention as can be understood from the above, when FM-CW or CW radar waves transmitted from an oncoming vehicle are received, i.e. as received interference waves which have a larger amplitude than (desired) reflected waves from a preceding object, which vary in frequency with respect to time, and may result in an interference signal that produces aliasing when subjected to A/D conversion, the interference components can be removed by simple signal processing.

This is basically achieved by examining short intervals of each channel signal (expressed as short data segments SD) that are sufficiently short that it can be assumed that interference components do not vary in frequency during each short interval. Momentary values of interference component frequency (momentary beat frequency values) are thereby obtained corresponding to each of successive time axis positions. Derivation of these momentary frequency values is possible due to the fact that the power level of the received interference radar waves will in general be substantially higher than that of the desired (reflected) radar waves, and that at each point in time, the frequency of the interference components in the channel signals will in general be substantially higher than that of the desired received signal component. A complex frequency spectrum of the interference components is thereby obtained, from which the phases of the interference components of respective channels can be derived. That is used to obtain a phase compensation table expressing (for each of successive data timings and each of the channels) amounts by which the components of a channel signal must be shifted in phase such as to set the interference components of the channels in a specific fixed phase relationship, corresponding to a specific (apparent) direction of received interference waves. Preferably this is the 0° (straight-ahead) direction, for ease of processing. The interference components can then be readily eliminated, and the remaining frequency components of the channel signals are then restored to their previous phase relationships.

What is claimed is:

1. An electronic scanning radar apparatus comprising:
a transmitting antenna driven by a transmission signal to transmit FM-CW (frequency-modulation continuous-wave) or CW (continuous-wave) electromagnetic waves, a receiving antenna comprising an array of antenna elements, and signal mixer circuitry for mixing received signals of a plurality of channels respectively corresponding to said antenna elements with said transmission signal, to derive respective beat signals of said channels, A/D converter circuitry for sampling and quantizing each of said beat signals with a fixed sampling frequency, to convert said beat signals to respective channel signals and store successive interval or samples of said channel signals as respective channel data sets, each of said channel data sets comprising a fixed number of data values corresponding to respective data timings, circuitry for extracting a plurality of short data segments from each of said channel data sets, each of said short data segments comprising a fixed plurality of data values, interference component detection circuitry configured to derive respective frequency spectra corresponding to said short data segments, and to obtain from said frequency spectra a plurality of momentary frequency values of interference components of said channel signals, said momentary frequency values corresponding to respective ones of said data timings, interference suppression circuitry configured to process said momentary frequency values in conjunction with said channel data sets, for adjusting a direction of arrival of received electromagnetic waves corresponding to said interference component, and removing components of said channel data sets corresponding to said adjusted direction, to thereby obtain respective interference-suppressed channel data sets, and direction estimation circuitry configured to process said interference-suppressed channel data sets for estimating a direction of arrival of electromagnetic waves reflected from a target object;

wherein said radar apparatus further comprises:

phase compensation table generating circuitry configured to derive a plurality of sets of interference component phase compensation values based on said momentary frequency values, said sets respectively corresponding to said data timings, and phase compensation values within each of said sets respectively corresponding to said channels;

interference phase adjustment circuitry configured to process said channel data sets in accordance with said interference component phase compensation values, to shift respective interference components corresponding to said channels to a predetermined phase relationship indicative of a predetermined direction of arrival of received electromagnetic waves;

interference removal circuitry configured in accordance with said predetermined phase relationship, for removing said phase-shifted interference components from said channel data sets; and phase restoration circuitry configured to restore remaining signal components expressed by said channel data sets to a phase condition existing prior to said phase shifting.

2. An electronic scanning radar apparatus as claimed in claim 1, wherein said predetermined phase relationship is a condition of phase synchronism of said interference components of respective channel signals, and wherein said interference removal circuitry is configured to remove a common-mode component or an average value component of said channel signals.

3. An electronic scanning radar apparatus as claimed in claim 1, wherein said phase compensation table generating circuitry is configured to:
   analyze a complex frequency spectrum constituted by said data values and said momentary values of frequency, to derive a plurality of sets of vector quantities, said sets corresponding to respective ones of said data timings and vector quantities of each of said sets respectively corresponding to said channels, and each of said vector quantities comprising a phase term; and
   derive said phase compensation values based on respective ones of said phase terms.

4. An electronic scanning radar apparatus as claimed in claim 1, comprising a switch coupled between said plurality of antenna elements and said signal mixer, and switching control circuitry configured to control said switch for selectively connecting respective ones of said antenna elements to said signal mixer circuitry.

* * * * *